United States Patent [19]

Moore

[11] Patent Number: 5,186,751
[45] Date of Patent: Feb. 16, 1993

[54] LAMINATED WIPER

[75] Inventor: Beverly L. Moore, Madill, Okla.

[73] Assignee: Oklahoma Steel & Wire Co., Inc., Madill, Okla.

[21] Appl. No.: 676,560

[22] Filed: Mar. 28, 1991

[51] Int. Cl.⁵ .............................................. B05C 11/02
[52] U.S. Cl. ..................................... 118/109; 118/122; 118/126; 118/420; 118/DIG. 19; 428/286; 428/920
[58] Field of Search ............... 118/109, 121, 122, 125, 118/126, 420, 423, DIG. 19, DIG. 22; 428/286, 212, 920

[56] References Cited

U.S. PATENT DOCUMENTS

| | | | |
|---|---|---|---|
| 2,435,766 | 2/1948 | Baley | 118/122 |
| 2,684,349 | 7/1954 | Whelton | 428/920 X |
| 3,047,442 | 7/1962 | Bozzacco | 428/429 X |
| 3,573,123 | 3/1971 | Siegel et al. | 428/920 X |
| 4,238,257 | 12/1980 | Remi et al. | 428/920 X |
| 4,368,685 | 1/1983 | Peel et al. | 118/125 X |
| 4,733,630 | 3/1988 | Sugimoto et al. | 118/109 |
| 4,916,003 | 4/1990 | Lesech et al. | 428/920 X |

Primary Examiner—W. Gary Jones
Assistant Examiner—Todd J. Burns
Attorney, Agent, or Firm—Wood, Phillips, VanSanten, Hoffman & Ertel

[57] ABSTRACT

There is disclosed an improved wiper head which includes a laminated wiper including a plurality of discrete layers of a fibrous material and means for bonding the layers to provide a unitary structure. A wiper holder is mounted adjacent an exit end of a tank and includes structure for supporting the wiper in a path of movement of the wire so that the wiper removes excess plating material from the wire.

10 Claims, 1 Drawing Sheet

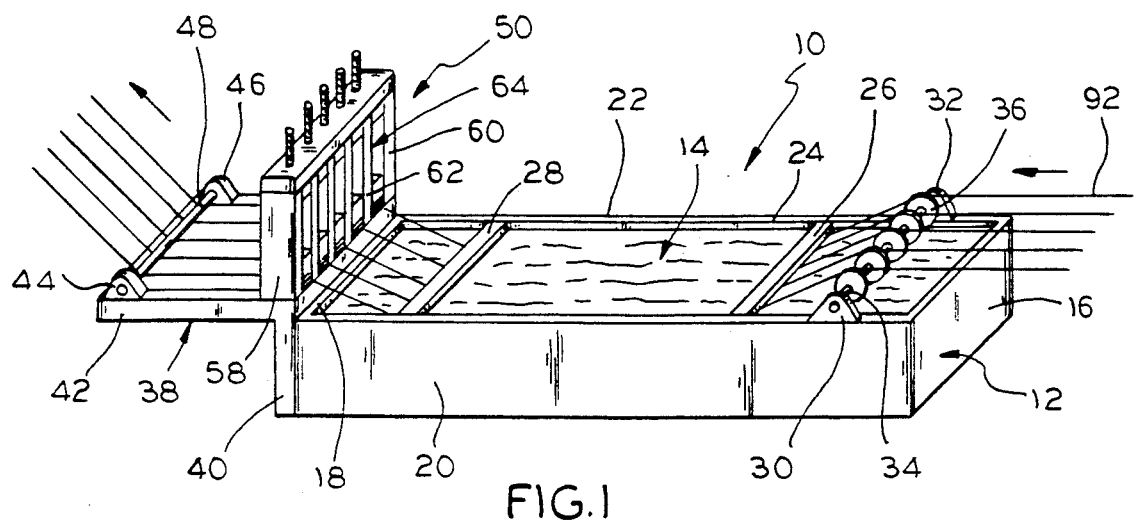
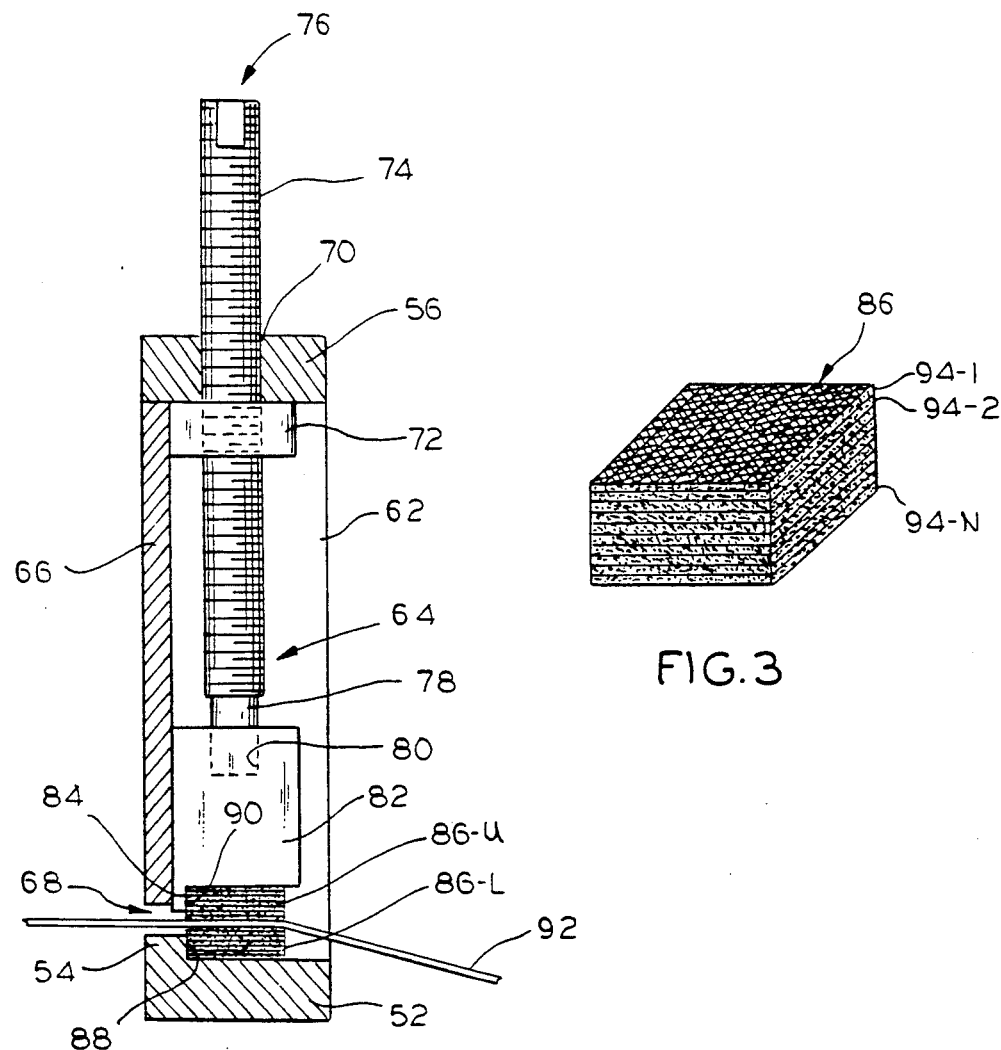

LAMINATED WIPER

FIELD OF THE INVENTION

This invention relates to wire plating systems and, more particularly, to an improved wiper therefor.

BACKGROUND OF THE INVENTION

Steel wire has found wide application, particularly in connection with masonry. The wire can be used, for example, as a truss system to provide stability to masonry walls and the like. The wire can be subject to moisture both during and after construction. The moisture can cause corrosion of the wire which might bleed through the masonry and also deteriorate the strength of the wire.

Galvanizing is commonly used to prevent corrosion of steel. Galvanizing has long been used on steel wire, such as that used for masonry reinforcement.

One known system for galvanizing steel wire contemplates plating the wire with a zinc base material. A typical system includes a plating tank holding a plating material and suitable conveying structure for drawing wire through the plating tank from an entry end to an exit end to apply the plating material to the wire. To avoid excess material on the wire, such systems often employ wipers sandwiching the wire at the exit end. The wire passes between an upper and lower wiper to remove the excess. The wipers must function without rapid deterioration from the pulling of the wire thereacross. Also, since the plating material is often heated, the wipers must withstand the higher temperatures while continuing to serve the intended function.

One common wiper comprises a coil of asbestos fabric material wound to form a block of suitable configuration. While asbestos is an adequate material for such an application, it is inherently dangerous. Alternatives to asbestos, which are safer, tend to be much more expensive. Since the wipers are generally only used for relatively short periods of time, they are intended to be disposable. Thus, the wipers should be inexpensive so that they can be thrown away and replaced as necessary.

The present invention is intended to overcome one or more of the problems set forth above in a novel and simple manner.

SUMMARY OF THE INVENTION

There is disclosed herein, according to the invention, a laminated wiper used in a wire plating system.

Broadly, there is disclosed an improved wiper head comprising a laminated wiper including a plurality of discrete layers of a fibrous material and means for bonding the layers to provide a unitary structure. A wiper holder is mounted adjacent an exit end of a tank and includes means for supporting the wiper in a path of movement of the wire so that the wiper removes excess plating material from the wire.

It is a feature of the invention that the wiper includes an outermost layer in contact with the wire and a plurality of inner layers and the outermost layer is made of a different fibrous material from the inner layers.

It is a feature of the invention that the outermost layer is of a refractory fiber material.

It is a further feature of the invention that the inner layers are of fiberglass material.

It is yet another feature of the invention that the bonding means comprises silicon rubber bonding to each layer and filling in spaces between adjacent layers.

Further features and advantages of the invention will readily be apparent from the specification and from the drawings.

BRIEF DESCRIPTION OF THE DRAWINGS

FIG. 1 is a perspective view of a wire plating system incorporating the laminated wiper according to the invention;

FIG. 2 is a sectional view of a wiper head of the plating system of FIG. 1; and

FIG. 3 is a perspective view of a laminated wiper used in the plating system of FIG. 1.

DESCRIPTION OF THE INVENTION

FIG. 1 illustrates a wire plating system 10 according to the invention. The plating system 10 includes a plating tank 12 holding a plating material 14. The plating material 14 may be, for example, a zinc based plating material used for galvanizing steel.

The plating tank 12 is a box-like tank having opposite end walls 16 and 18 connected by opposite sidewalls 20 and 22, and a bottom wall (not shown). The end walls 16 and 18 and the sidewalls 20 and 22 define an open top 24 through which the plating material 14 can be filled. A first crossbar 26 extends across the tank 12 and is connected to the opposite sidewalls 20 and 24, spaced closer to the end wall 16. For simplicity herein, the tank end adjacent the end wall 16 is referred to as the entry end as this is the wall at which the wire enters the tank, while the end associated with the end wall 18 is referred to as the exit end. A second crossbar 28, parallel to the first crossbar 26, extends across the tank 12 and is connected to the opposite side walls 20 and 22 spaced more closely to the exit end wall 18.

Extending upwardly from each side wall 20 and 22, between the end wall 16 and first crossbar 26, are opposite brackets 30 and 32, respectively. A rod 34 is carried by and extends between the two brackets 30 and 32, above the tank. The rod serves as an axle for five pulleys 36 longitudinally spaced along the rod 34.

Fastened to the exit end wall 18, by any known means, is an L-shaped frame 38. The frame 38 has a vertical wall 40 abutting the outside of the exit end wall 18 connected at a right angle to a horizontal wall 42. The horizontal wall 42 extends away from the exit end wall 18 and is positioned just above the top level of the tank 12. Extending upwardly at opposite sides of the horizontal wall 42 are brackets 44 and 46. The brackets 44 and 46 support a rod 48 therebetween and spaced slightly above the horizontal wall 42.

A wiper head 50, according to the invention, is mounted atop the horizontal wall 42 flush with the vertical wall 40. As also illustrated in FIG. 2, the wiper head 50 includes an elongate bottom plate 52 having a longitudinally extending, upper raised flange 54 at its exit edge. A top plate 56 is spaced above and parallel to the bottom plate 52. The plates 52 and 56 are of equal length. A pair of end plates 58 and 60 extend between the bottom plate 52 and top plate 56. Four intermediate wall plates 62 also extend vertically between the bottom plate 52 and top plate 56 and are equally spaced from another to define chambers 64 between adjacent ones of said intermediate plates 62 or end plates 58 and 60. Thus, five such chambers 64 are provided, corresponding to one for each pulley 36, discussed above.

A back plate 66, see FIG. 2, extends downwardly from the top plate 56 and is adhered to a rear edge of each plate 58, 60 and 62. The back plate 66 terminates immediately above the bottom plate flange 54 to define a space 68 therebetween. The top plate 56 includes five spaced openings 70, each centered above one of the chambers 64. A female threaded element 72 is secured to the underside of the top plate 56 aligned with each such opening 70. A threaded rod 74 extends downwardly through each opening 70 and is threadably received in the element 72. The rod 74 includes a slot 76 at an upper end to facilitate rotation. The rod 74 includes an unthreaded extension 78 at its lower end received in a bore 80 in a holding block 82. The holding block is generally of a size to be received in the chamber 64 and includes a downwardly extended flange 84 at its rear edge 66.

Mounted in each chamber 64 are a pair of laminated wipers 86-L and 86-U. The lower wiper 86-L is placed atop the bottom plate 52 abutting against a shoulder 88 on the inside of the flange 54. The upper wiper 86-U is placed atop the lower wiper 86-L and abuts against a shoulder 90 defined by the inside portion of the block flange 84.

In use, anywhere from one to five lengths of wire 92 can be plated simultaneously. Each wire 92, which may be supplied from, for example, supply reels of wire (not shown), is placed atop one of the pulleys 36 and then extends diagonally downwardly below the crossbars 26 and 28 and then diagonally upwardly and threaded between the two wipers 86-L and 86-U, see FIG. 2, and then outwardly and below the exit end rod 48 from which they are collected on take-up reels (not shown). The take-up reels are normally driven to draw the wire 92 through the plating tank 12 from the supply reels so that suitable plating material 14 is coated on the wire 92. Because the wire 92 passes between the wipers 86-L and 86-U, any excess material is removed therefrom.

Each wiper 86-L and 86-U is identical in construction. Therefore, only one is described in detail and is referenced without the suffix L or U.

FIG. 3 illustrates the wiper 86. The wiper 86 is a laminated wiper comprising a plurality of discrete layer 94-1 through 94-N of a material. In the illustrated embodiment, a total of ten layers are provided. Each layer 94 is of a fibrous material. The outermost layer 94-1 is the layer that contacts the wire 92, in use. Particularly, and as illustrated in FIG. 2, the lower wiper 86-L is mounted with the outermost layer 94-1 facing upwardly, and the upper wiper 86-U is mounted with the outermost layer 94-1 facing downwardly.

According to the invention, the outermost layer 94-1 is of a different fibrous material from the remaining, inner layers 94-2 through 94-N. According to the invention, the outer layer 94-1 is a layer of refractory fiber material. One acceptable form of such material is tape of Fiberfrax ® refractory fiber (Fiberfrax ® is a registered trademark of Carborundum Company). Since only the outermost layer 94-1 directly contacts the wire 92, it is not necessary that the remaining layers 94-2 through 94-N be of a refractory fiber material. By using discrete layers, the wiper 86 can be provided using the refractory fiber material only as the outermost layer 94-1, thus saving significantly on costs. The inner layers 94-2 through 94-N may be of a fiberglass material.

In manufacturing the wiper 86, the discrete layers 94 are bonded together using a silicone rubber material which bonds to each layer and fills in spaces between adjacent layers. The resulting wiper 86 is generally of a rectangular cubicle configuration of a size corresponding to that required for the chamber 64.

To mount the wiper 86, prior to or subsequent to threading the wire 92, the bottom wiper 86-L is placed atop the bottom plate 52. With the threaded rod 76 turned to position the block 82 in an upper, remote position, the upper wiper 86-U is placed above the lower wiper 86-L. Thereafter, the rod 74 is turned to position the block 82 in a lower position so that the wipers 86-L and 86-U abut one another with the wire 92 being positioned therebetween.

The laminated wiper according to the invention is advantageous in that only an outermost layer must be of material suitable for the plating tank environment. This is contrary to the teachings of prior wipers using a coil configuration which required that the entire coil be all of the same material. The wiper is generally only used for a single application and then thrown away. As a result, it is preferable that the wiper be inexpensive. Presently, the cost differential between the refractory fiber tape used as the outermost layer and the fiberglass tape used in the inner layers is approximately eighteen to one. As a result, sufficient cost savings are achieved by using the discreet layer construction.

The disclosed embodiment of the invention illustrates the broad inventive concepts comprehended hereby.

I claim:

1. In a wire plating system for providing a plating coat on a wire and including a plating tank holding a plating material and means for drawing wire through the plating tank from an entry end to an exit end to apply the material to the wire, an improved wiper head comprising:

a laminated wiper comprising a plurality of discrete layers of a fibrous material and means for bonding said layers to provide a unitary structure wherein said wiper includes an outermost layer in contact with the wire and a plurality of inner layers spaced from the wire; and a wiper holder mounted adjacent the exit end of said tank and including means for supporting said wiper in a path of movement of the wire so that the wiper outermost layer removes excess plating material from the wire.

2. The improved wiper head of claim 1 wherein the outermost layer is made of a different fibrous material from the inner layers.

3. The improved wiper head of claim 2 wherein said outermost layer is of a refractory fiber material.

4. The improved wiper head of claim 2 wherein said inner layers are of fiberglass material.

5. The improved wiper head of claim 1 wherein said bonding means comprises silicone rubber bonding to each said layer and filling in spaces between adjacent layers.

6. In a wire plating system for providing a plating coat on a wire and including a plating tank holding a plating material and means for drawing wire through the plating tank from an entry end to an exit end to apply the material to the wire, an improved wiper head comprising:

a pair of laminated wipers each comprising a plurality of discrete layers of a fibrous material and means for bonding said layers to provide a unitary structure wherein each said wiper includes an outermost layer in contact with the wire and a plurality of inner layers spaced from the wire; and a wiper holder mounted adjacent the exit end of said tank and including means for supporting said wipers opposite one another in a path of movement of the wire with said wipers sandwiching the wire so that the wipers remove excess plating materials from the wire.

7. The improved wiper head of claim 6 wherein the outermost layer is made of a different fibrous material from the inner layers.

8. The improved wiper head of claim 7 wherein said outermost layer is of a refractory fiber material.

9. The improved wiper head of claim 7 wherein said inner layers are of fiberglass material.

10. The improved wiper head of claim 6 wherein said bonding means comprises silicone rubber bonding to each said layer and filling in spaces between adjacent layers.

* * * * *